Sept. 10, 1929.  D. E. HENNESSY  1,727,372
APPARATUS AND METHOD FOR FORMING FABRIC AND RUBBER ELEMENTS
Filed Feb. 28, 1924  3 Sheets-Sheet 1
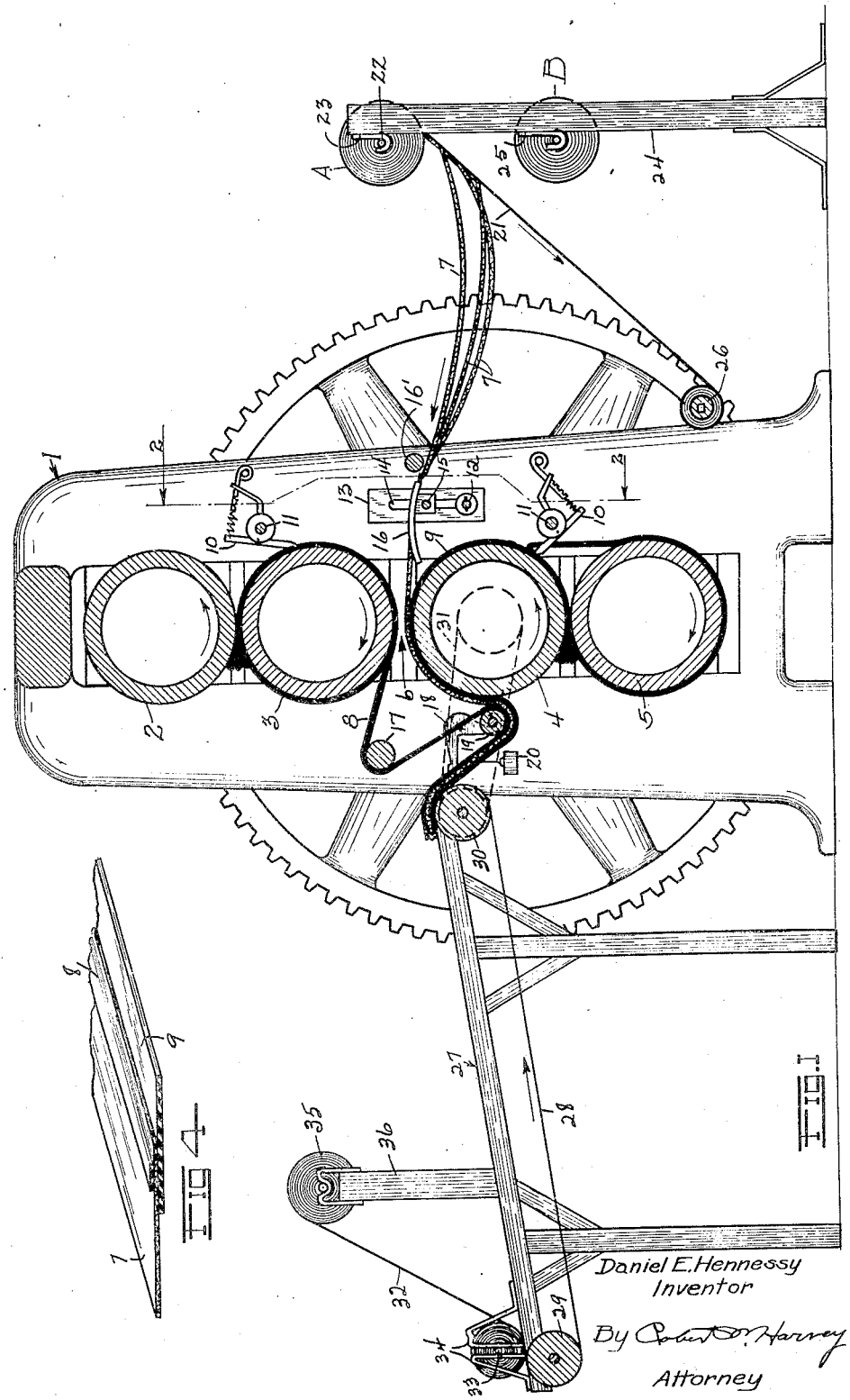

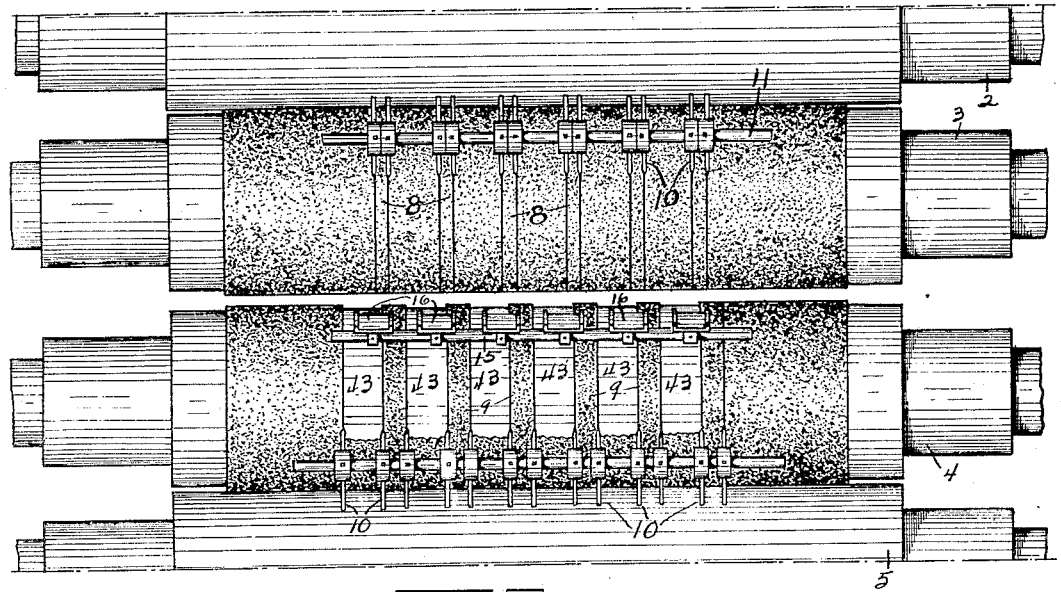

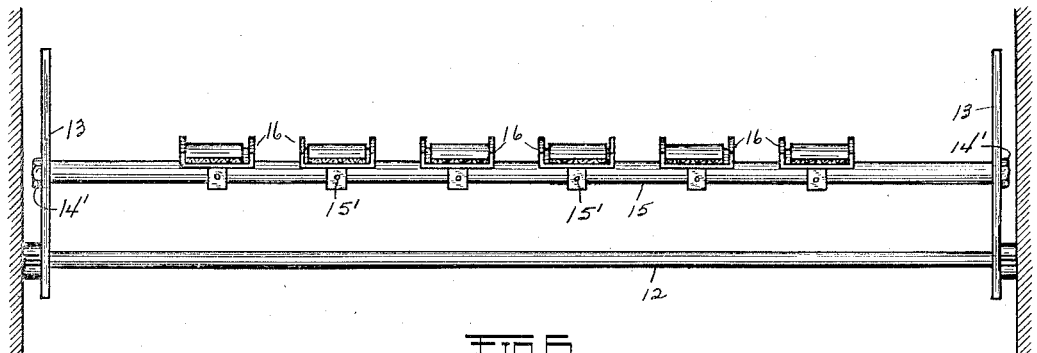
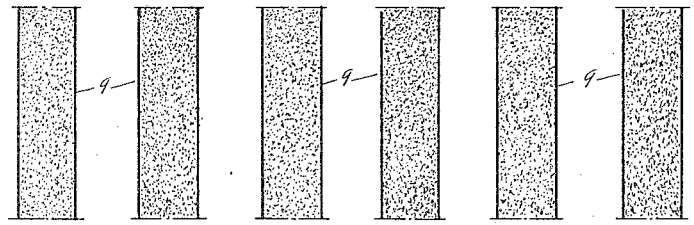
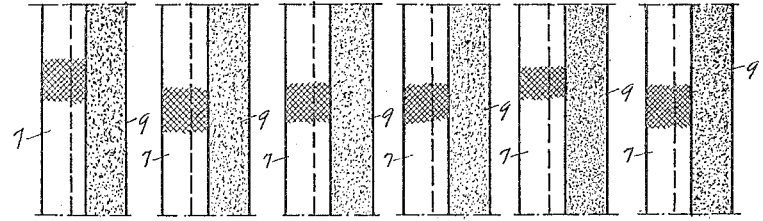
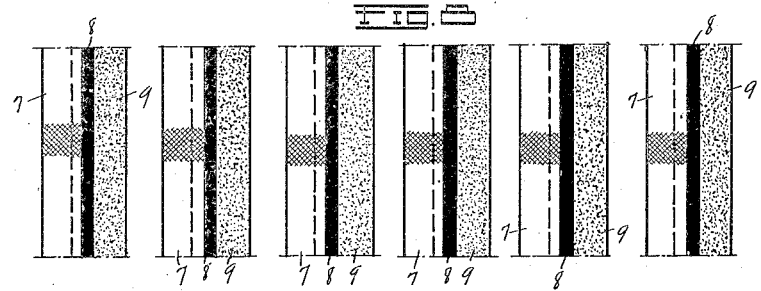
Daniel E. Hennessy
Inventor

Patented Sept. 10, 1929.

1,727,372

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

APPARATUS AND METHOD FOR FORMING FABRIC AND RUBBER ELEMENTS.

Application filed February 28, 1924. Serial No. 695,718.

In the building of tire casings, it is customary to build the carcass of rubberized fabric and afterwards cover the carcass by applying chafing strips, gum strips, side wall rubber, cushion strip, breaker strip, and tread rubber all at their proper locations on the carcass. By my invention I provide a new method of forming and combining two or more of the covering strips into a better laminated structure for application to the tire carcass than has heretofore been known. The means by which I accomplish this result saves much of the time and labor involved in prior practice.

The objects of my invention will be clear from its illustrative embodiment and description as well as the claims.

Fig. 1 is a vertical section through a four-roll rubber calender shown with co-operating means arranged to work my invention to advantage.

Fig. 2 is a detail view as the central rolls of the calender appear from the right of Fig. 1, showing the relation of the rubber strips formed on the calender and certain adjacent fabric guides.

Fig. 3 is a detail showing a modification of the means indicated in Fig. 1 for taking off surplus rubber strips from calender roll 4.

Fig. 4 is a perspective view of a fragment of an assembled side wall construction which may be formed according to my invention.

Fig. 5 is a detail showing a modification of the way in which rubber strips may be applied to the fabric and rubber strips on calender roll 4.

Fig. 6 is a detail showing the manner in which the fabric guides are supported and the position of the fabric in the guides.

Figs. 7, 8 and 9 show diagrammatically the steps that take place on the calender roll in the formation of the unit side wall strips.

Referring to Fig. 1, a four-roll calender is shown at 1. It may be of any desired or usual construction adapted to form one rubber sheet between rolls 2 and 3 and another rubber sheet between rolls 4 and 5. According to my invention, I adjust the calender rolls so that a sufficient space is left between the two rolls 3 and 4 so that other strips of material may be fed continuously in the desired registering relation (usually overlapping) to the rubber strips cut from the sheets formed on the calender rolls and whereby all of the strips may be most conveniently joined in a continuous operation as and when the rubber sheets are being formed. So far as I am aware, the arrangement thus briefly described is new and constitutes one of the broad features of my invention.

The specific illustration of Figs. 1 and 2 is applicable to the simultaneous production of a plurality of so-called unit side wall construction strips such as shown in Fig. 4. Each of such strips consists of a fabric strip 7 known as the chafing strip (usually of bias cut rubberized square woven fabric rather than cord fabric, but herein referred to generally as fabric whether square woven, cord, or cord fabric whether cut on the bias or not), a gum strip 8 of thin rubber, and a strip of side wall rubber stock 9 of relatively thick rubber (usually of a distinctive color for the side wall covering of the tire). The gum strip 8 is placed so as to overlap both of the strips 7 and 9 while the two latter strips are placed in overlapping relation. For structural reasons it is important that all such strips be accurately assembled in position. When they are applied to the tire it is important for the sake of the best appearance that the demarkation between the rubber covering strips on the outside be uniform. Hand work does not accomplish all the desired results in these respects.

In Fig. 1, the gum strips are formed on roll 3 by cutting the rubber sheet on that roll as it meets the suitably spaced knives 10 adjustably and pivotally mounted on cross rod 11 and held by springs so as to press against the sheet. It is the usual way of cutting strips from a rubber sheet on a calender and need not be described further. The side wall strips are cut in the same manner by knives 10 bearing against roll 4. The desired strips on roll 4 are cut so as to register in predetermined relation respectively with the desired co-ordinated strips cut on roll 3 and so that they register in predetermined positions with the fabric strips 7 fed between rolls 3 and 4 as all such strips pass between said rolls.

To provide for the desired registration of the strips, it is necessary to separate the rubber between spaced strips after they are cut on each of rolls 3 and 4. This separation on roll 4 is accomplished by leading the unwanted intermediate strips as they are cut, away from roll 4 to and around roll 5 until they join the rubber bank, as indicated in Fig. 1, leaving the rubber strips 9 on the calender roll as indicated in Figs. 2 and 7. From roll 3, however, I lead the desired strips away over the freely rotatable roll 17 mounted in the calender frame, and then back between pressure roll 19 and roll 4 while the unwanted strips are left on roll 3 to complete their rotation and meet their original rubber bank and be re-worked.

This arrangement leaves roll 4 uncovered at the portions 43 (see Fig. 2) intermediate the desired strips as they pass between rolls 3 and 4. Thus I am able to feed fabric strips 7 onto the uncovered portions of roll 4 but in overlapping relation to rubber strips 9 thereon as clearly indicated in Figs. 4 and 8. The two strips 7 and 9 of each unit are then fed with roll 4 to meet their respective gum strip 8 in the bight of rolls 19 and 4 which press them all together in accurately registering relation according to the predetermined plan illustrated in Figs. 4 and 9, completing the assembly, before rubber strips 9 leave the calender roll.

The roll 19 rotatably carried in pivoted arms 18 mounted in the calender frame is arranged so as to be urged by weight 20 against roll 4 by any usual mounting suitable to such a yielding pressure roll. Thus roll 19 is rotated by roll 4 and with the latter presses all the strips of the assembled side wall units so that each has its individual strips firmly cohering as they are taken off roll 19 by conveyor belt 28.

The fact that the two rubber strips 8 and 9 are joined to the rubberized fabric strip 7 practically as soon as such strips 8 and 9 are formed from the warm rubber on the calender, gives a much better adhesion and cohesion of the parts than when they are joined at a later period and after they have cooled.

To insure the proper feeding operation for the plurality of fabric strips 7, I provide the following means: A cross rod 12 adjacent roll 4 supports two vertically arranged plates 13 adjacent the side frames of the calender. These plates are splined on rod 12 for lateral adjustment. Slots 14 in said plates provide means for supporting and vertically adjusting a cross bar 15 by the usual bolt and nut construction 14' bearing against the sides of plates 13 adjacent the slots. Supported on said cross bar 15 are horizontally arranged fabric guides 16 extending towards and ending closely adjacent the roll 4 and substantially tangent to said roll. These guides are preferably arranged by any suitable means as set screws 15' to be longitudinally adjustable on rod 15.

The strips 7 are fed from rolls A on rods 22 freely rotatable in journals 23 on standards 24. Additional rolls B are similarly hung below rolls A in journals 25. As the upper rolls give out, the lower ones are put in their place and the ends of the fabric strips quickly spliced so that the feeding operation may be continuous. The liner 21 for the rubberized strip 7 is wound up on roll 26 frictionally driven from any suitable source or from the calender. As strips 7 are fed towards guides 16, they pass under a freely rotatable roll 16' provided to prevent their leaving guides 16 in the event that they should fail to properly leave the liner or should adhere to roll A. The strips 7 run freely over guides 16, the slight weight of the fabric between liners 21 and guides 16 being the only opposition to their movement to the guides. By this arrangement the strips 7 are applied free of substantial tension to the strips 9 on the calender rolls, thus accomplishing the desired uniting of the strips without distortion. The guides 16 are slightly wider than the width of the fabric so that there will be no tendency for the fabric to be restrained by the sides of the guide, this freedom of movement being shown in Figure 6. the spacing being slightly exaggerated in the drawing in the interest of clearness. As the assembled units are taken by the conveyor belt 28 mounted on auxiliary frame 27 over rolls 29 and 30, they are moved at the same speed as the peripheral speed of the calender roll 4. This is brought about by a suitably geared chain drive 31 from the calendar roll to roll 30 as indicated in Fig. 1. The completed strips are wound into a liner or liners 32 upon rod 33 rotatably held in guides 34. The liner material is supplied from roll 35 mounted in spaced supports 36.

When the speed of calender roll 5 is less than that of roll 4, as is sometimes the case in calender operations, different means are necessary for moving the unwanted strips from roll 4. Such other means are shown in Fig. 3. As there shown, the excess strips are carried around guide rolls 37 and 38, the former driven from roll 40 through belt 38', and onto belt 39 carried by rolls 40 and 41. The latter is driven by sprocket chain 42 from a sprocket mounted on the shaft of roll 30 and so geared that the speed of belt 39 is the same as that of the periphery of roll 4. From belt 39 the unwanted rubber strips may be removed and returned to the calender or otherwise suitably disposed of to be used over again.

Instead of the plan indicated in Fig. 1, the gum strips 8 may be led directly from roll 3 to their proper positions on roll 4 as indicated in Fig. 6.

As is evident from the above description and drawings, the individual strips are substantially free of tension during their movement to and from the calender. All moving supports for said strips are driven from and at the same speed as the calender rolls upon which the rubber strips are formed, and the free areas 43 (see Fig. 2) permit the chafing strips free and non-distorting movement with the rubber side wall strip. The substantially simultaneous forming of the rubber strips and their application to the fabric precludes any change in temperature of the rubber strips which therefore unite with each other and the fabric at calender temperature, thus obviating any tendency toward later separation or distortion.

By means of the unit assembly of the three strips as shown in Fig. 4 all accurately positioned as described, such strips may be applied to the sides of a tire in one operation. If the finishing is done by hand, the unit assembly speeds up the work and renders its appearance superior to the usual methods. Such unit assembly of strips moreover is peculiarly adapted for their application to the tire carcass by a machine operation, because they are so firmly stuck together in accurate relative positions. When a machine operates by rolls to press the assembly against the tire carcass, the individual strips will not be displaced readily as they would if assembled by other means than by my invention.

I claim:

1. An apparatus of the character described, comprising a calender adapted to form a sheet of rubber, means to cut the sheet into strips while on the calender roll and leave bare portions intermediate said strips, means to feed other strips into predetermined overlapping relation with the first named strips and said bare portions, and means to press said overlapping strips into firm contact.

2. An apparatus of the character described, comprising a calender adapted to form a sheet of rubber, means to cut the sheet into strips while on the calender roll and leave bare portions intermediate said strips, means to feed other strips without substantial tension into predetermined overlapping relation with the first named strips and said bare portions, and means to press said overlapping strips into firm contact.

3. An apparatus of the character described, comprising a calender adapted to form a sheet of rubber, means to cut the sheet into strips while on the calender roll and leave bare portions intermediate said strips, means to feed other strips without substantial tension into predetermined overlapping relation with the first named strips and said bare portions, and means to press said overlapping strips into firm contact while on the calender roll.

4. An apparatus of the character described, comprising a calender adapted to form a sheet of rubber, means to cut the sheet into strips while on the calender roll and leave bare portions intermediate said strips, means to feed other strips without substantial tension into predetermined overlapping relation with the first named strips and said bare portions, and a roll acting against said calender roll to press said overlapping strips into firm adhesion with each other.

5. An apparatus of the character described, comprising a calender adapted to form two sheets of rubber, means to cut said sheets into strips while on the calender and leave bare portions intermediate the strips on one of said sheets so as to have the last named strips positioned in overlapping relation with certain co-ordinated strips of the other sheet, means to feed other strips into predetermined overlapping relation with said pairs of co-ordinated strips, and means to press said overlapping strips into firm contact whereby a set of strips each consisting of three overlapping laminated strips, is delivered from the calender.

6. An apparatus of the character described, comprising a calender adapted to form a sheet of rubber, means to cut the rubber into strips while on the calender roll and leave bare portions intermediate said strips, means to return the rubber from said bare portions to the rubber stock to be again worked into said sheet, means to feed other strips into predetermined overlapping relation with the first named strips and said bare portions, and means to press said overlapping strips into firm contact.

7. An apparatus of the character described, comprising a calender adapted to form a sheet of rubber, means to cut the sheet into strips while on the calender roll and leave bare portions intermediate said strips, means to feed other strips into predetermined overlapping relation with the first named strips and bare portions, means to press said overlapping strips into firm contact and a take-off means for said laminated strips operable at a speed corresponding to the peripheral speed of the calender rolls upon which said sheets of rubber are formed.

8. An apparatus of the character described, comprising a calender adapted to form a sheet of rubber, means to cut the sheet into strips while on the calender roll and leave bare portions intermediate said strips, individual guiding means for each of a series of additional strips to guide the same into predetermined overlapping relation with the first named strips and said bare portions, and means to press said overlapping strips into firm contact.

9. An apparatus of the class described, comprising in combination a four-roll calender having its intermediate rolls substantially separated, adapted to form two sheets of rubber, means to cut both of said sheets into strips, means to take away the rubber between certain of said strips in each sheet so as to leave the others in predetermined position relatively to the strips of the other sheet of rubber, means to accurately guide a third set of strips in predetermined position against the strips of one sheet as they pass between said separated rolls, and means to press the strips of the other sheet upon the two sets of strips already joined as they leave the calender, all constructed and arranged so that said sets of strips are all laminated while they are without substantial tension and while the rubber of the calendered strips is warm.

10. An apparatus of the character described, comprising a calender adapted to form a relatively thick sheet of rubber to cover a tire carcass, means to cut the sheet into strips while on the calender roll, means to feed relatively thin fabric strips against said rubber strips, and means to press the fabric against the rubber while on the calender.

11. An apparatus for laminating individual fabric strips with a plurality of rubber strips, comprising in combination a four-roll calender adapted to form two sheets of rubber, means to cut said sheets into strips, and means to feed fabric strips into predetermined positions each located between two strips one from each of said rubber sheets while they are on the calender.

12. An apparatus for laminating rubber material, comprising a four-roll calender adapted to form two sheets of rubber and pass them between the two intermediate calender rolls but without contact one with the other, means to feed a third sheet of material between said intermediate rolls in contact with only one of said rubber sheets, and means to press the other rubber sheet on said third sheet after its passage through said calender rolls.

13. The method of laminating rubber and fibrous strips which consists in forming the rubber strips on a calender roll with the surface of the latter adjacent said strips free of rubber and applying fibrous strips in predetermined overlapping relation to said rubber strips while on the calender roll.

14. The method of laminating rubber and fibrous strips which consists in forming the rubber strips on a calender roll with the surface of the latter adjacent said strips free of rubber and applying fibrous strips without substantial tension to said rubber strips in predetermined overlapping relation therewith, while the latter are on the calender roll.

15. The method of laminating fibrous and rubber strips which consists in forming the rubber strips on a calender roll with that portion of the calender roll adjacent the rubber strip free of rubber, applying a fibrous strip to the rubber strip with a portion of the former overlying the free portion of the calender roll, and applying a third strip to overlie both the rubber and fibrous strips.

16. The method of forming laminated strips at least one member of which is composed of rubber, which consists in forming said member on a calender roll with the surface of the latter adjacent said member free of rubber, and applying other strips to said rubber member in overlapping relation therewith and while said member is on the calender roll.

17. The method of forming a laminated strip which consists in forming a rubber strip on a calender roll with the surface of the latter adjacent said strip free of rubber and applying a second strip of material in overlapping relation to said rubber strip while the latter is still on the calender roll.

18. The method of forming a laminated strip which consists in forming a sheet of rubber on a calender roll, cutting said sheet to form a strip of desired width, removing the surplus rubber to leave the surface of the calender roll adjacent said strip free of rubber and applying a second strip of material in predetermined overlapping relation to said rubber strip while the latter is still on the calender roll.

In testimony whereof I have signed my name to the above specification.

DANIEL E. HENNESSY.